April 28, 1925.  
G. B. VROOM  
1,535,272  
ALTITUDE DIFFERENCE INSTRUMENT  
Filed Nov. 25, 1921   3 Sheets-Sheet 1
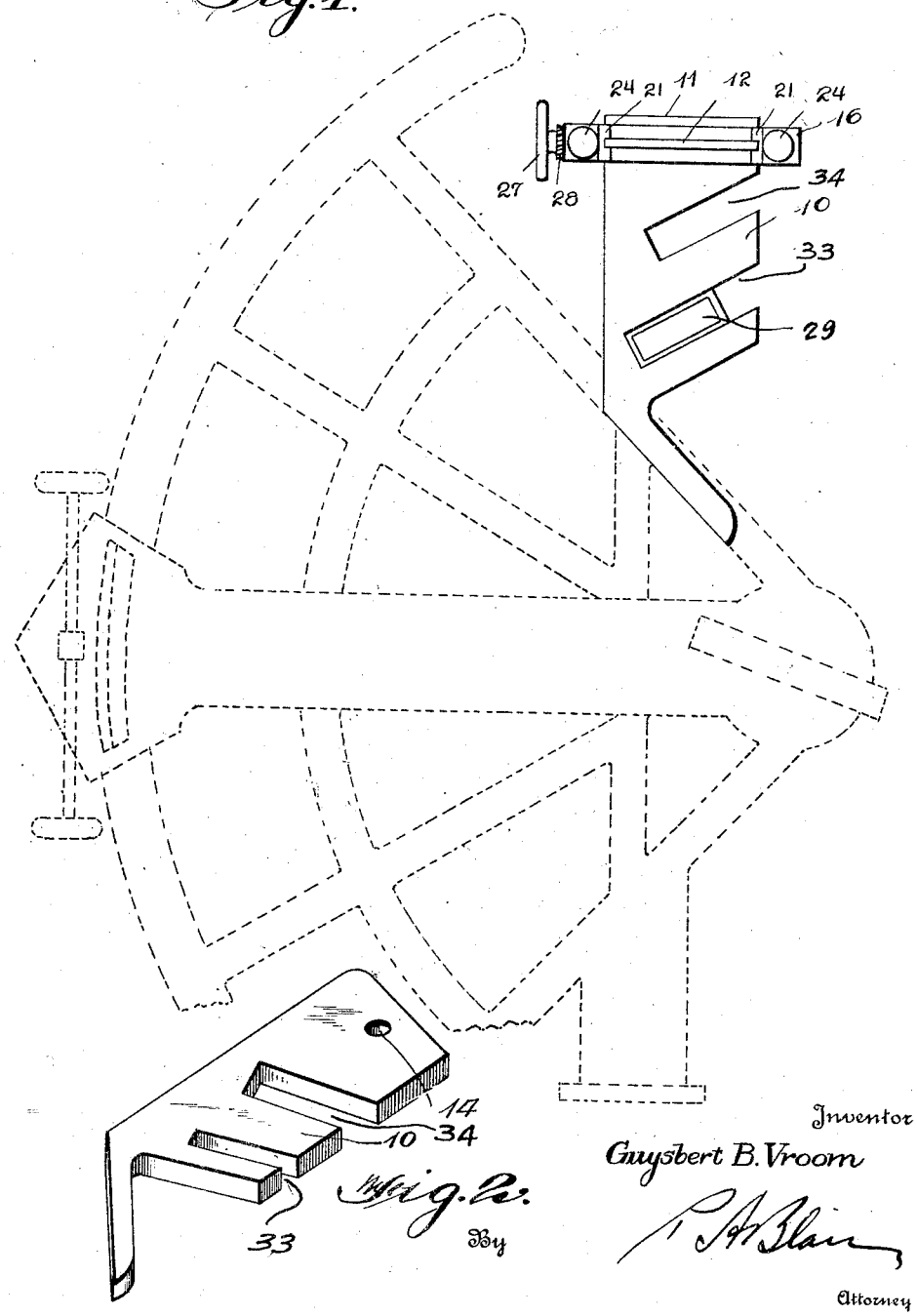
Inventor  
Guysbert B. Vroom  
By  
Attorney April 28, 1925.

G. B. VROOM 1,535,272

ALTITUDE DIFFERENCE INSTRUMENT

Filed Nov. 25, 1921

Inventor
Guysbert B. Vroom
By
Attorney

April 28, 1925.

G. B. VROOM 1,535,272

ALTITUDE DIFFERENCE INSTRUMENT

Filed Nov. 25, 1921  3 Sheets-Sheet 3

Inventor
Guysbert B. Vroom

Attorney

Patented Apr. 28, 1925.

1,535,272

UNITED STATES PATENT OFFICE.

GUYSBERT B. VROOM, OF PHILADELPHIA, PENNSYLVANIA.

ALTITUDE-DIFFERENCE INSTRUMENT.

Application filed November 25, 1921. Serial No. 517,626.

*To all whom it may concern:*

Be it known that GUYSBERT B. VROOM, a citizen of the United States, residing at Philadelphia, in the county of Philadelphia and State of Pennsylvania, has invented certain new and useful Improvements in Altitude-Difference Instruments, of which the following is a specification.

This invention has relation to the standard navigating or surveying sextant, and more particularly to an altitude difference instrument which, by its use in connection with the sextant, permits the taking of observations at night without reference to the horizon.

One of the objects of the invention is to provide an inexpensive, durable and efficient altitude difference instrument to be used in conjunction with a navigating or surveying sextant by which the navigator is enabled to obtain the data necessary for the mathematical solution of the "Astronomical Triangle" without reference to the horizon, and thereby to fix the position of his craft or vessel.

A further object is to provide an auxiliary to the sextant which is simple in design and construction, and which, when used in connection with the sextant, increases its value to a great extent by rendering it independent of the horizon when navigational stars are visible.

Another object of this invention is to provide an auxiliary to the sextant which is easily adjusted, and, when used requires no special design of sextant.

A further object is the provision of an altitude difference instrument by which, when used in connection with the sextant, the necessary data to fix the position of a craft or vessel may be obtained without reference to the horizon, which instrument is not affected by the vibration or motion of the ship to any greater degree than the sextant itself.

A further object of this invention is the provision of an altitude difference instrument which, when used in conjunction with the navigating or surveying sextant, is independent of gravitational forces or levels.

This invention has as a further object the provision of an auxiliary to a navigating sextant which, when used in connection with a sextant, permits a new application of the mathematical principles now in use and, hence, is available to any sea officer, charged with navigational duties, without any further technical knowledge than required for his ordinary duties.

The invention, then, has for its object certain improvements both in means and in method permitting the use of the sextant regardless of horizon line, all as will be set forth fully in the following specification and pointed out in the appended claims.

Referring to the drawings, in which the corresponding reference numerals indicate corresponding parts,—

Figure 1 is a plan view of the altitude difference instrument in its relative position to the frame of the sextant;

Figure 2 is a perspective view of the holder plate;

Figure 3:
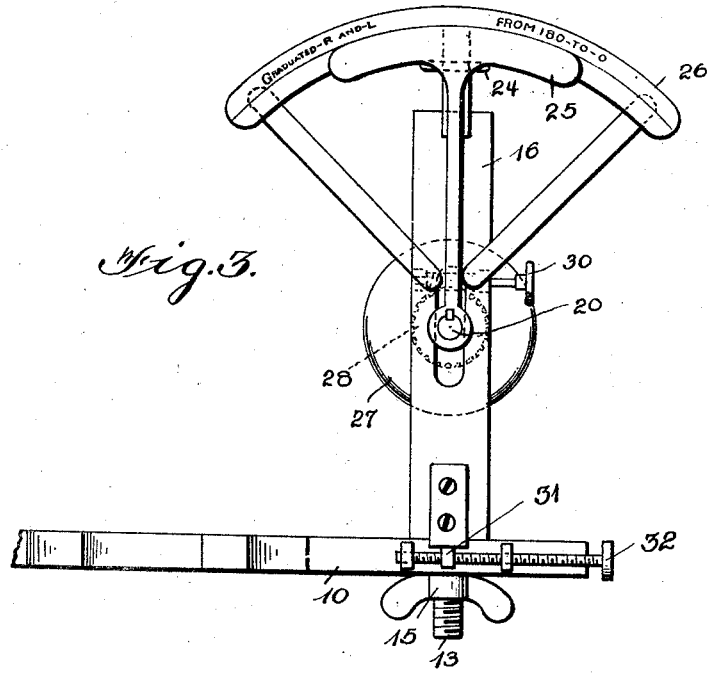
Figure 3 is a front elevational detail of the mirror stand, and vernier attachment.
Figure 4:
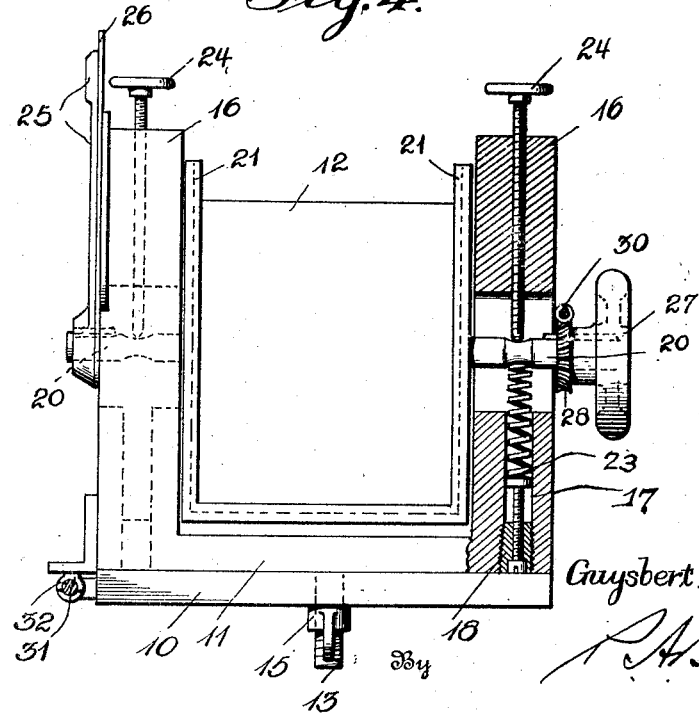
Figure 4 is a detail side elevation of the mirror in its relative position to the mirror stand.

It will be understood at the outset that the invention is not limited to the particular construction or details of the parts which I have seen fit to illustrate, nor to the exact method of procedure which I shall hereinafter describe as the invention is capable of modification, and, further, that the phraseology which I employ is for the purpose of description and not of limitation of the preferred form of invention shown.

Referring now in detail to the accompanying drawings, the altitude difference instrument consists of three essential parts. 10 denotes a holder plate, 11 a mirror stand and 12 a mirror. The mirror stand 11 is mounted by means of a screwed thimble 13 which fits a hole 14 and is firmly held by wing nut 15, on the plate 10, which is designed to conform to the construction of a sextant and adapted to be clamped or screwed thereon.

Arms 16 of the mirror stand 11 are drilled throughout their lengths as at 17 and these holes closed at their plate ends by screws 18. At the middle point of the arms are drilled holes to receive spindles 20 of a mirror holder 21, the latter holes being at right angles to the former. The mirror 12 is rigidly held by the mirror holder 21. When the mirror holder is in place its spindles 20 are held in a vertical position by spiral springs 23 in each longitudinal hole 17 of the mirror arms 16, and may be adjusted by means of adjusting screws 24 which bear on the spindles 21 and vary the tension on the springs 23. This construction permits of the adjustment of the spindle in the plane of the mirror stand, and also affords a means by which the axis of the mirror frame is made parallel to the plane of the sextant.

The top pivot bearing of the mirror frame 21 carries a pointer and vernier 25, which is used in connection with a graduated arc 26 carried by the upper arm of the mirror stand. The lower bearing which projects through the lower arm of the mirror stand is terminated in a knob 27 by means of which the mirror holder and the mirror may be turned about the spindle as an axis for the purpose of bringing the image of the star to the eyes of the observer. The lower arm of the spindle also carries a tangent screw 28 which permits, in connection with a threaded adjusting rod 30, a fine adjustment of the mirror angle when an observation is taken. The mirror stand 11 is also provided with a tangent worm 31 which, coacting with a screw 32, permits a fine adjustment of the mirror stand 11 relative to the holder plate 10. The mirror plate 10, which as hereinbefore mentioned is designed to conform to the shape of the sextant, is provided with cut out portions as at 33 and 34 to accommodate the horizon glass and sunshade fittings respectively.

When the instrument is mounted on a sextant, it is so adjusted that the axis of the mirror holder spindles bisects the horizon glass 29 of the sextant, as seen from the point of sight of the observer. Thus mounted and adjusted, the line of sight passes through the center of the mirror whose vertical axis bisects the horizon glass, is perpendicular to the line of sight, and parallel to the plane of the sextant.

The angle through which the mirror is turned is read off on the graduated arc. This arc reads 180° when the plane of the mirror is perpendicular to the plane of the sextant, and graduated right and left of said zero point, at 30′ intervals to zero, so marked, however that the actual angle is doubled as read. The vernier is so graduated as to give readings to the nearest minute.

Figure 5:
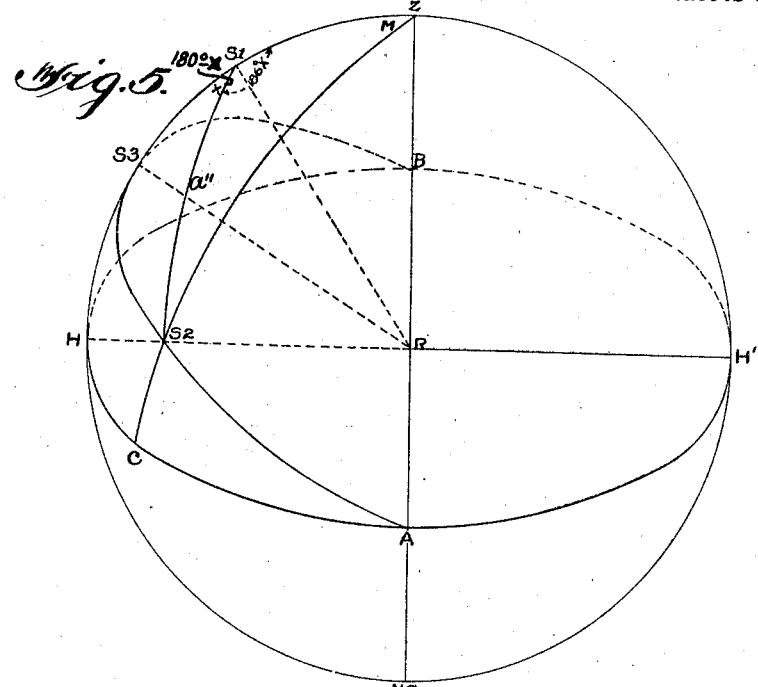
Figure 5 and Figure 6 illustrate the celestial sphere, by which drawings the theory and application of the altitude difference instrument is later shown.

Referring now to Figure 5, the theory of said altitude difference instrument shall hereinafter be shown. This figure represents the celestial sphere. $S_1$ and $S_2$ are two stars. $HZH'Na$ is a vertical circle passing through $S_1$. $HBH'A$ is the horizon. $AS_2S_3B$ is a great circle, and is the trace of a plane passed through the sphere, its diameter $AB$ coinciding with the diameter of the sphere which includes the points $A$ and $B$, which points are 90° from the vertical circle $HZA'Na$, measured on the horizon. Therefore, the great circle $HZH'Na$ intersects $HBH'A$ at an angle of 90°. $S_1S_2$ is an arc of a great circle and, for any pairs of stars not planets, is constant. If $S_1S_2$ and $S_2S_3$ can be measured, the spherical triangle, of which $S_1S_2S_3$ is a right angle, can be solved. It is essential, of course, that $S_1S_3$ be measured along the vertical circle; and, while the circle is invisible, the true value can be obtained by means of reading on each side of the circle, and solving for the true value, since an observer can tell when this sextant is several degrees off the vertical.

Assume that the observer is at the center of the sphere. If, in addition to his sextant, he is provided with an attachment by means of which the image of star $S_2$ can be "brought across" at the same time that the image of $S_1$ is "brought down" the two images will be seen in coincidence, at $S_3$, provided that the sextant is held vertically. For the discussion of the theory, assume that it is so held. The requirements of a supplementary instrument then, are, that the axis of the mirror in which the image of $S_2$ is seen shall be perpendicular to the plane $AS_2B$; that is, perpendicular to the line of sight of the sextant, since the line $S_3R$ is the reflected ray from $S_2$ produced backward, and by the laws of optics the direct and reflected rays lie in the same plane. In order that $S_1S_2S_2$ shall be a right angle, the axis of the mirror must be parallel to the plane of the sextant and perpendicular to the line of sight. The instrument as designed and adjusted fills these requirements.

Again referring to Figure 5, the angle M is the difference of azimuth of the two bodies, as calculated for the dead reckoning position at the time of sight.

From the triangle $S_1S_2S_3$, $a''$ and $x$ are calculated; therefore, in the triangle $S_2SZ$ the parts $a''$, angles $S_2S_1Z$ (180°−X) and M are known. From these data $S_2Z$, the coaltitude of $S_2$ is calculated. This altitude corresponds to the observed altitude of an ordinary sight and may be so used in a Marc. St. Hilaire or other application. Special Case: When $S_1$ is the Pole Star, it may be reduced to the pole by use of the tables in the Nautical Almanac, $S_1S_2$ corrected accordingly and X computed. X is then the hour angle of the star $S^2$.

Figure 6:
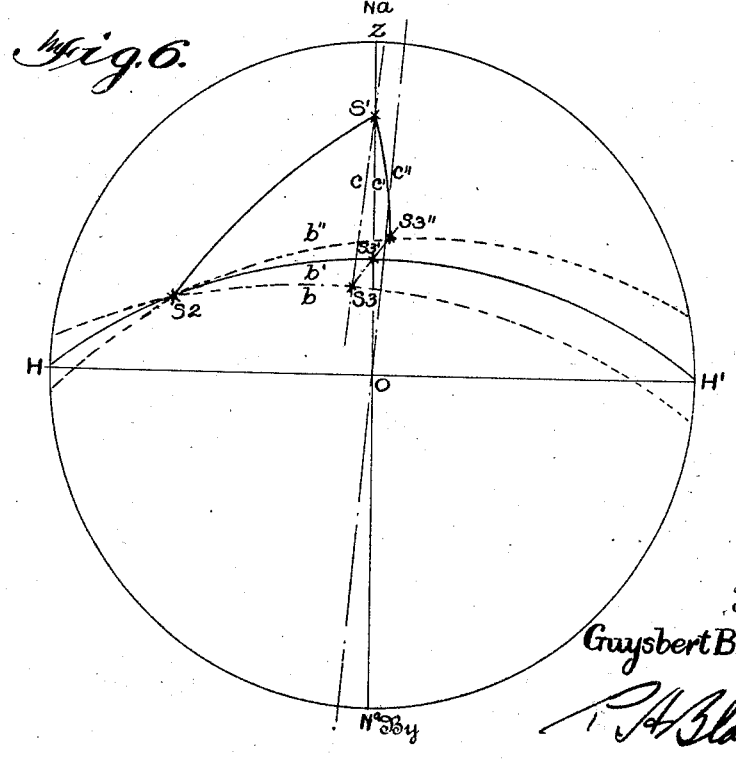

Referring now to Figure 6, the use of the altitude difference instrument is hereinafter described and explained. The instrument is mounted and adjusted to fulfill the requisite conditions, this being done when there is a visible horizon, and the instrument thereafter protected against shock and damage, in the following manner:

First see that the sextant itself is in adjustment, so that an unbroken image of the horizon is obtained when sextant scale reads zero. Next mount the altitude difference instrument, adjusting as nearly as possible, by eye, so that the plane of the mirror appears to be perpendicular to the line of collimation. With the sextant limb reading zero, turn the mirror of the altitude difference instrument slowly, observing whether the two reflected images of the horizon are in the same straight line. If they are not, adjust the mirror by means of the tangent screw on the holder plate, and the screws in the arms of the mirror stand until continuity of image is obtained.

In Figure 6, $NaHZH'$ is a vertical circle. $ZNa$ is the vertical circle passing through the star $S_1$, $HOH'$ is the horizon, invisible to the observer, whose position is at $O$, the center of the celestial sphere. $S_1$ and $S_2$ are two stars, selected with a view to obtaining a well proportioned triangle ($S_1 S_3 S_2$). If the altitudes of the stars are too nearly equal, the image of $S_2$ will appear above the image of $S_1$, because $S_3 S_2$ is the arc of a great circle. The parts of this spherical triangle are discussed under Figure 6. The object is to find the value of $c'$, the arc of the vertical circle included between $S_1$ and the coincident images of $S_1$ and $S_2$, located at $S_3$. (Note: The sides of the three triangles are labeled with small letters, which will thereafter be used.)

As it is impossible for an observer to be sure that he brings down the image of $S_1$ vertically, one value of the side $c$, on each side of the vertical, together with the corresponding values of $b$ is read off when the images are coincident, $S_1$ being "brought down" and $S_2$ "brought across."

In the triangle $S_1 S_2 S_3''$, $c''$ and $b''$ are read off. In the triangle $S_1 S_2 S_3$, $c$ and $b$ are read off and recorded. The time is noted in each case, and the observations should be as close together as possible. (It is suggested that $c''$ should be made 4° less than $c$ or as much less as will assure the observer that his sextant is not vertical.)

From the above known sides:

$$\cos b' = \sqrt{\cos b'' \cos b}$$
$$\cos c' = \cos c'' \cos b'' \sqrt{\sec b'' \sec b}$$

or $\log \cos c' = \log \cos c'' + \log \cos b'' + \tfrac{1}{2} \log \sec b'' + \tfrac{1}{2} \log \sec b$.

It should be noted that $S_1 S_3 S_2$ is always a right angle. $c'$ and $b'$ are the quantities required for the solution of the triangle.

The following computations involve both Figure 5 and Figure 6 to which we now refer:

To find angle $X$:
$$\cot x = \sin c \cot b.$$
To find $a''$:
$$\cos a'' = \cos b \cos c$$
To find $h_{s2}$:
$$\frac{\cos h_{s2}}{\sin (180 - x)} = \frac{\sin a'}{\sin M}.$$

where $M$ is the difference of azimuths of the stars $S_1$ and $S_2$, computed for the dead reckoning position:

$$\frac{\cos h_{s2}}{\sin x} = \frac{\sin a''}{\sin (z - z')}$$

Therefore $$\cos h_{s2} = \sin a'' \sin x \operatorname{cosec} (z - z')$$

where $h_{s2}$ is the altitude of the star $S_2$.

The present invention fulfills the long felt want of an inexpensive and simple instrument which, when used with any design or type of navigating or surveying sextant, permits a navigator to determine the position of his craft or vessel when navigational stars are visible with no reference to the horizon, said instrument being independent of gravitational forces and levels. By means of this altitude difference instrument, the navigator, with no special technical knowledge other than that required in his ordinary duties, is enabled by the previously described instrument and methods of use to obtain the two parts comprising the necessary data for the solution of an astronomical triangle, said triangle, due to the construction of the instrument, being always a right-angled triangle.

The invention is exceedingly simple in use and construction and is believed to accomplish the methods and objects set forth herein.

I claim:

1. An altitude difference instrument comprising a holder plate, a mirror stand and a mirror, said holder plate adapted to accurately fit the frame of a sextant and having cut out portions therein to accommodate the horizon glass and sunshade glass fittings, said mirror being positioned in the line of collimation of said sextant passing through said horizon glass.

2. An altitude difference instrument comprising a holder plate, a mirror stand, a mirror, a pivotally mounted mirror holder, said mirror being rigidly held by said mirror holder, said mirror holder having spindles pivoted in arms of the said mirror stand, means by which said spindles are held in a relatively vertical position, and adjustable means by which these spindles can be adjusted to the plane of the mirror stand.

3. An altitude difference instrument comprising a holder plate, a mirror stand and a mirror, said mirror being mounted in a mirror holder, said mirror holder being pivotally journaled in said mirror stand, a graduated arc arranged on said mirror stand and a pointer carried by the mirror holder whereby the angle of rotation of the mirror with relation to said mirror stand may be determined.

4. In combination with navigating or surveying sextant, an altitude difference instrument comprising a holder plate, a mirror stand and a mirror, said mirror being positioned in the line of collimation of said sextant, said holder plate being adapted to be rigidly attached to the frame of the sextant, said mirror stand being adapted to be held in a normally fixed position relative to said holder plate, said mirror being pivoted in the arms of said mirror stand, and means by which both the mirror and the mirror stand may be adjusted as desired.

5. In combination with a navigating or surveying sextant, an altitude difference instrument comprising a holder plate, a mirror stand, a pivotally mounted mirror, said holder plate mounted on the frame of a sextant, and adapted to accommodate the horizon glass and shade glass fittings said mirror upon rotation adapted to bring across an image on the line of sight passing through said horizon glass.

6. In combination with a navigating or surveying sextant having a horizon glass, an altitude difference instrument comprising a holder plate, a mirror stand, a mirror, means consisting of a mirror holder, said mirror holder having spindles which are journaled in the arms of said mirror stand, by which said mirror can be turned about said spindles as an axis whereby an image is brought across the line of collimation passing through said horizon glass, and means by which the resulting angle of rotation can be measured.

7. In combination with a navigating or surveying sextant, an altitude difference instrument comprising a holder plate, a mirror stand and a mirror, said mirror being pivotally mounted in the line of collimation of said sextant, and means to determine the rotation of the mirror, said means comprising an arc mounted on said mirror stand and a pointer associated with said mirror and adapted to be rotated therewith.

8. In combination with a navigating or surveying sextant, an altitude difference instrument comprising a holder, plate, mirror stand and mirror, means by which said altitude difference instrument, when mounted on the frame of said sextant, can be so adjusted that the line of collimation of said sextant passes through the center of said mirror, and so that the vertical axis of said mirror bisects the horizon glass, is perpendicular to the line of sight, and parallel to the plane of the sextant, said means comprising a mirror holder pivotally mounted in said mirror stand, and adjusting screws permitting a fine adjustment of said mirror and mirror holder.

9. In combination with a navigating or surveying sextant, an altitude difference instrument comprising a holder plate, a rotatably mounted mirror stand and mirror, said mirror upon rotation adapted to bring across an image on the line of collimation of said sextant, means by which the angle of rotation of the mirror observations may be finely adjusted, said means comprising a tangent screw and adjusting rod associated with said mirror and mirror stand, a graduated arc mounted on said mirror stand, and a pointer associated with said mirror, whereby the angle of rotation of said mirror may be determined.

10. An altitude difference instrument comprising a holder plate, a mirror stand, and a mirror pivotally mounted in said stand, said mirror adapted to be rotated about its axis whereby when applied to a sextant and the image of an object brought across the line of collimation of said sextant sighted on a second object by the rotation of said mirror, the measurement of two sides of a right spherical triangle may be obtained without recourse to a visible horizon or leveling apparatus depending upon gravitational forces.

11. The method of measuring two parts of a right angle astronomical triangle, said method being independent of the use of levels and apparatus dependent upon gravitational forces and independent of the visible horizon, which method consists in selecting two stars, " bringing down " the image of one of said stars on the line of collimation of a sextant, and " bringing across " the image of other of said stars by the rotation of a pivotally mounted mirror associated with said sextant so that they meet at a certain point to form a coincident image, said point forming with the two of said stars a right spherical triangle, determining the arc of said image " brought down " and the arc of said image " brought across ", and solving the right spherical triangle therefrom.

12. In combination with a navigating or surveying sextant adapted to " bring across " an image on the line of collimation thereof, means mounted on said sextant and associated therewith to measure two parts of a right angled astronomical triangle, said means including a mirror rotatably mounted with relation to said sextant and positioned in the line of collimation thereof, said mirror adapted upon rotation to " bring down "

the image of a star to a point coincident with the image of a second star "brought across" on the line of collimation of said sextant.

13. In combination with a navigating or surveying sextant adapted to "bring across" an image on the line of collimation thereof, means positioned on said sextant and associated therewith to measure two parts of a right angled astronomical triangle, said means including a mirror rotatably mounted on said sextant and positioned in the line of collimation thereof, said mirror adapted upon rotation to "bring down" the image of a star to a point coincident with the image of a second star "brought across" on the line of collimation of said sextant, and means to determine the arc of said image "brought down" and the arc of said image "brought across".

14. In combination with a navigating or surveying instrument adapted to "bring across" an image on the line of collimation thereof, means positioned on said instrument and associated therewith to measure two parts of a right angle astronomical triangle, said means including a mirror rotatably mounted on said instrument, means to adjust the mirror with respect to said instrument whereby the line of collimation of said instrument passes through the center of said mirror and is perpendicular to the vertical axis of said mirror, said mirror adapted upon rotation to "bring down" an image to a point coincident with a second image "brought across" on the line of collimation of said sextant, and means to determine the arc of said image "brought down" and the arc of said image brought across.

15. In combination with a navigating or surveying sextant adapted to "bring across" an image on the line of collimation thereof, a mirror, means secured to said sextant providing a rotatable mounting for said mirror, means to adjust said mirror with respect to said sextant whereby the line of collimation of said sextant passes through the center of said mirror and is perpendicular to the vertical axis thereof, said mirror upon rotation adapted to "bring across" an image on the line of collimation of said sextant, and means to measure the angle of rotation of said mirror.

In testimony whereof I affix my signature.

GUYSBERT B. VROOM.